United States Patent [19]

Mestre

[11] 3,722,239
[45] Mar. 27, 1973

[54] STEERING WHEEL LOCKING DEVICE FOR VEHICLES

[76] Inventor: Francisco Mestre, 1834 S.W. 27th Avenue, Miami, Fla. 33145

[22] Filed: Oct. 7, 1971

[21] Appl. No.: 187,443

[52] U.S. Cl. ..........................70/212, 70/58, 248/27, 248/220.5, 285/191, 287/20 R
[51] Int. Cl. ..........................B60r 25/02, E05b 73/00
[58] Field of Search ........70/18, 53, 209, 212; 85/80; 248/27, 220.5, 223; 285/191; 287/20 R

[56] References Cited

UNITED STATES PATENTS

| 998,582 | 7/1911 | Lucas | 285/191 |
|---|---|---|---|
| 2,152,565 | 3/1939 | Peterson | 70/212 |
| 2,421,015 | 5/1947 | Davidson | 285/191 |
| 2,999,663 | 9/1951 | Anderson | 248/220.5 |

FOREIGN PATENTS OR APPLICATIONS

| 10,046 | 1893 | Great Britain | 248/220.5 |

Primary Examiner—Albert G. Craig, Jr.
Attorney—John Cyril Malloy

[57] ABSTRACT

A device for preventing full steering manipulation of the steering wheel of an automobile comprising, a padlock for locking engagement around either the ring or spoke portion of the steering wheel and a chain connecting between the padlock and a tubular member which is adapted to be received through a hole in the dashboard and latched therein in a manner so as to prevent removal thereof from the outer side of the dashboard.

6 Claims, 3 Drawing Figures

PATENTED MAR 27 1973

3,722,239

INVENTOR.
FRANCISCO MESTRE

BY John Cyril Malloy

ATTORNEY.

STEERING WHEEL LOCKING DEVICE FOR VEHICLES

BACKGROUND OF THE PRESENT INVENTION

Various means have been devised to prevent manipulation of the steering wheel of an automobile such as lock means extending between the steering wheel of the vehicle and a control pedal, such as the accelerator, or between the steering wheel and the steering wheel column or the hand brake.

Another approach to preventing turning of the steering wheel was to lock a complete covering means about the steering wheel.

Most of these devices are quite complicated and are expensive to manufacture and provide a storage problem when not in use. In addition, some are quite time consuming to apply each time the car is left unoccupied.

A great number of the car thefts are perpetrated by young people who simply "borrow" a car for a joy ride and then abandon it a short time later. Such thefts generally occur on a spur of the moment decision by the thieves or, if planned in advance, the thieves look for a car in which they can make a quick get-a-way.

The device of the present invention provides a simple and inexpensive means to prevent the theft of a car and which presents no storage problem when not in use. A padlock is provided which can be locked around the ring or spoke of the steering wheel and a chain connects between the padlock and a tubular member which is latched within a hole in the dashboard of the car. When not in use, the hasp of the lock is engaged through a hole, provided in a lug on the tubular member, and is always in reach for a rapid application to the steering wheel after parking the car.

OBJECTS AND ADVANTAGES OF THE PRESENT INVENTION

One of the principal objects of the present invention is to provide a simple means to lock the steering wheel of a car against full rotation and which requires a minimum amount of time to engage with or disengage from said steering wheel.

Another object of this invention is to provide a key operated padlock which is chain connected to a tubular means which is latched in a hole in the dashboard of an automobile.

Yet another object of the instant invention is to provide a hole in a lug, extending outwardly from the tubular means, to receive the hasp of the padlock when not in use.

Another object of this invention is to provide a spring loaded latch means, within the tubular member, which is engageable in an appropriately sized hole in the dashboard of an automobile from the forward side of said dashboard, yet is not removable therefrom from the forward side.

A further object of the present invention is to provide a device, for locking the steering wheel of an automobile against full rotation, which is inexpensive to manufacture and extremely simple in operation.

DETAILED DESCRIPTION OF THE DRAWINGS

Figure 1:
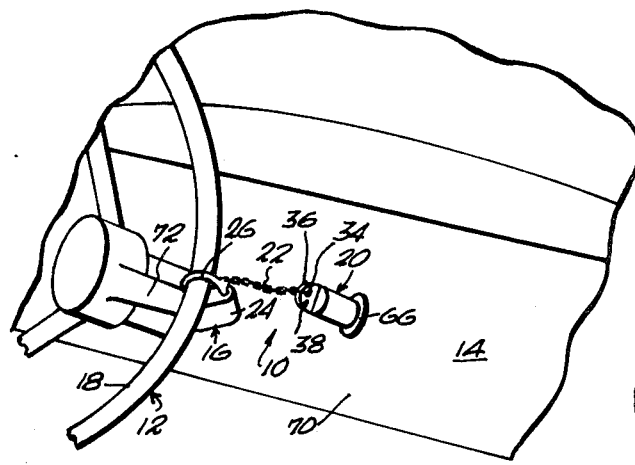
FIG. 1 is a fragmentary perspective view of the steering wheel and dashboard of an automobile with the steering wheel locking device of the present invention extending therebetween.

Referring to the drawings in which like reference numerals designate like or similar parts throughout the various views and with particular reference to FIG. 1, the steering wheel locking device of the present invention is designated generally at 10, extending in locking engagement between the steering wheel 12 and the dashboard 14 of an automobile.

The locking device 10 comprises a key operated padlock 16, illustrated in locked engagement about the ring portion 18 of a steering wheel 12, a tubular member 20 latched to the dashboard 14, and a chain 22 fixed between the padlock 16 and the tubular member 20. The padlock 16 may be of any conventional form including a casing 24 and a hasp 26, operable between locked and unlocked positions by a conventional key means 28. The claim 22 may be fixed at one end 29 to an ear 30, formed integral with the hasp 26, or may include an end link which is engageable by the hasp 26 to hold said end when the hasp 26 is in a locked position.

The opposed end 32 of the chain 22 is fixed through an aperture 34 in a lug 36, extending outwardly from the tubular member 20. A second aperture 38 is provided in the lug 36 to receive the hasp 26 of the padlock 16 when said padlock is not in use. In other words, the padlock is suspended from the lug 36 for storage while the automobile is in operation.

Figure 3:
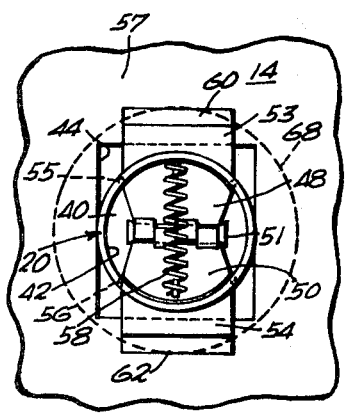
FIG. 3 is an end elevational view, from the inside of the dashboard, of the tubular member and the internal latching means.
Figure 2:
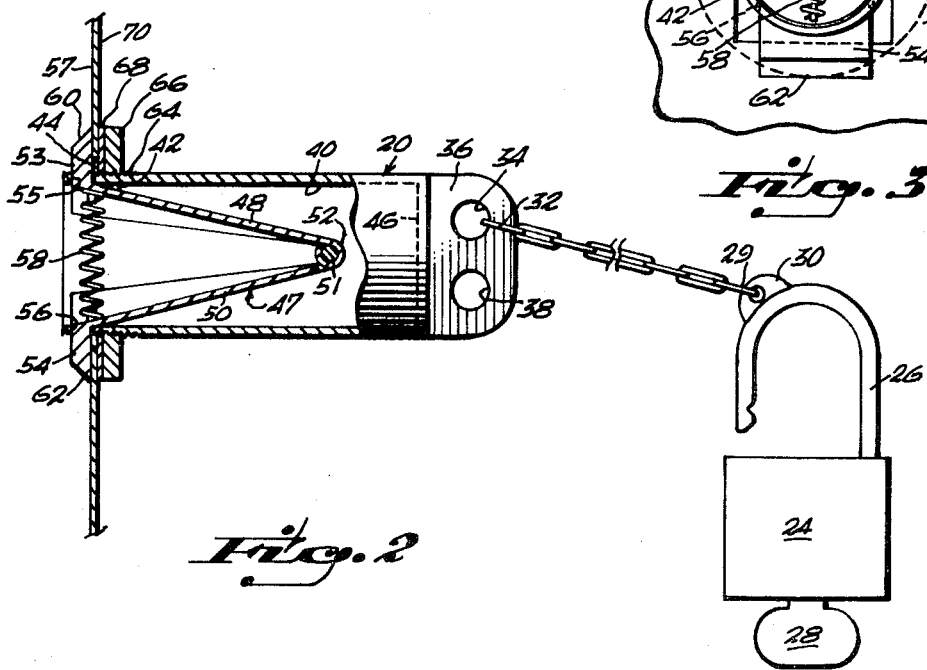
FIG. 2 is a fragmentary longitudinal sectional view taken through the tubular member, attached to the dashboard of an automobile and a key operated padlock attached thereto by means of a chain.

Referring to FIGS. 2 and 3, the tubular member 20 provides an inner annular chamber 40 having an open end 42, extending through an aperture 44 in the dashboard 14, and a closed end 46, formed integral with the lug 36. A generally V-shaped latch assembly 47 is provided within the chamber 40 which includes a pair of outwardly diverging legs 48 and 50, extending from a point of pivotal attachment to a pin 51 at the apex 52 to respective latch arms 53 and 54 at the outer distal ends thereof. The latch arms 53 and 54 extend in opposed directions, through respective apertures 55 and 56 in the annular wall of the tubular member 20, adjacent the inner open end 42, and overlie the inner surface 57 of the dashboard 14.

A compression spring 58 extends between the open outer ends of the legs 48 and 50 to maintain the latch arms 53 and 54 in the overlying relation to the inner surface 57 of the dashboard 14. The opposed ends of the latch arms 53 and 54 are preferably beveled as at 60 and 62. The inner portion of the tubular member 20 is screw threaded as at 64 and a nut 66 is threaded thereon against a washer 68, bearing against the outer surface 70 of the dashboard 14 to fix the tubular member in place relative to said dashboard 14.

In installation, an appropriately sized and shaped aperture 44 is provided in the dashboard 14 and the nut 66 is run back on the screw threads 64 of the tubular member 20. The outwardly diverging legs 48 and 50 are pivoted toward each other against the forces of the compression spring 58 by manually engaging the opposed beveled ends 60 and 62 of the latch arms 53 and 54 and the inner open end 42 of the tubular member 20 and the latch arms 53 and 54 are inserted through the aperture 44 whereupon the latch arms 53 and 54 are moved into engagement with the inner surface 56 of the dashboard 14, on opposed sides of the aperture 44, by the compression forces of the spring 58. The nut 66 is then tightened to firmly engage the dashboard 14 between the latch arms 53 and 54 and the washer 68.

The padlock 16, connected to the lug 36 by the chain 22, may then be suspended through the aperture 38 or placed in locking engagement about the ring portion 18 or a spoke 72 of the steering wheel 12.

What is claimed is:

1. A steering wheel locking device for vehicles having a steering wheel and a dashboard comprising, a chain having a first and a second end, lock means attached to said first end for locking engagement with the steering wheel, a tubular member having a closed outer end attached to said second end and an open inner end extending through an appropriate aperture in the dashboard; depressible spring loaded latch means carried by said tubular member to engage the inner surface of the dashboard and nut means threadably engaged on said tubular member, engageable against the outer surface of the dashboard.

2. A steering wheel locking device as defined in claim 1 including an outwardly extending lug formed integral with said closed end and including two through holes, the first of which comprises the attachment means for said second chain end.

3. A steering wheel locking device as defined in claim 1 in which said depressible spring loaded latch means comprises a pair of spring loaded legs within said tubular member, normally diverging outwardly from a point of pivotal attachment to a pivot pin, each of said legs including a latch arm angled outwardly through an aperture in the wall of said tubular member, in opposed directions, to overlie the inner surface of the dashboard, said pair of legs being depressible against said spring loading toward each other to provide for passage of said tubular member and latch means through said dashboard aperture.

4. A steering wheel locking device as defined in claim 1 including a washer interposed between said nut means and inner surface.

5. A steering wheel locking device as defined in claim 2 in which said lock means comprises a key operated padlock including a casing, and a hasp for locking engagement about the ring or a spoke of the steering wheel.

6. A steering wheel locking device as defined in claim 5 in which the second of said through holes in said lug is sized to receive the hasp of said padlock.

* * * * *